United States Patent
Gertjegerdes et al.

(10) Patent No.: US 11,286,906 B2
(45) Date of Patent: Mar. 29, 2022

(54) METHODS AND APPARATUSES FOR DATA INTERCHANGE WITH A WIND TURBINE OR A WIND FARM

(71) Applicant: Wobben Properties GmbH, Aurich (DE)

(72) Inventors: Stefan Gertjegerdes, Aurich (DE); Kai Busker, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/760,299

(22) PCT Filed: Nov. 19, 2018

(86) PCT No.: PCT/EP2018/081708
§ 371 (c)(1),
(2) Date: Apr. 29, 2020

(87) PCT Pub. No.: WO2019/101673
PCT Pub. Date: May 31, 2019

(65) Prior Publication Data
US 2020/0277934 A1    Sep. 3, 2020

(30) Foreign Application Priority Data
Nov. 21, 2017 (DE) ............. 10 2017 127 389.1

(51) Int. Cl.
*F03D 7/04* (2006.01)
(52) U.S. Cl.
CPC ............. *F03D 7/047* (2013.01); *F03D 7/046* (2013.01); *F03D 7/048* (2013.01)

(58) Field of Classification Search
CPC ........................................ F03D 7/047
(Continued)

(56) References Cited

U.S. PATENT DOCUMENTS 7,318,154 B2    1/2008  Tehee, Jr.
8,255,986 B2 *  8/2012  Ellis .................. H04L 63/0227
                                                  726/11
(Continued)

FOREIGN PATENT DOCUMENTS

DE    102009060417 A1    6/2011
DE    202014106258 U1    4/2015
EP       1519040 A1      3/2005

*Primary Examiner* — Suresh Suryawanshi
(74) *Attorney, Agent, or Firm* — Seed Intellectual Property Law Group LLP

(57) ABSTRACT

A security apparatus for data exchange of a component of a wind turbine or a wind farm, in particular a wind farm controller, with a remote computer. In that case the security apparatus includes a first data interface for connecting a component by way of a first data connection and a second data interface for connection to the remote computer by way of second data connection. In addition the security apparatus includes a third data interface for receiving a switching signal by way of a third data connection, a separable internal data connection between the first data interface and the second data interface and a switching unit which is adapted in dependence on the switching signal to separate and/or make a physical connection of the internal data connection. A system having such a security apparatus and a method of data exchange with a component of a wind turbine and/or a wind farm.

20 Claims, 2 Drawing Sheets

(58) Field of Classification Search
USPC .......................................................... 700/287
See application file for complete search history.

(56) References Cited

U.S. PATENT DOCUMENTS

| | | | |
|---|---|---|---|
| 2007/0266423 A1* | 11/2007 | Tehee | F03D 7/048 726/3 |
| 2011/0140431 A1* | 6/2011 | Landa | F03D 7/048 290/44 |
| 2012/0096537 A1 | 4/2012 | Ellis | |
| 2014/0165182 A1 | 6/2014 | Curry et al. | |
| 2014/0265330 A1* | 9/2014 | Carkner | F03D 7/0272 290/44 |
| 2018/0038346 A1* | 2/2018 | Booth | F03D 7/047 |
| 2018/0268581 A1* | 9/2018 | Demuth | F03D 7/048 |

\* cited by examiner

METHODS AND APPARATUSES FOR DATA INTERCHANGE WITH A WIND TURBINE OR A WIND FARM

BACKGROUND

Technical Field

The invention concerns the field of wind turbines and wind farms, wherein the invention is concerned in particular with communication between a wind turbine or a wind farm and a remote computer.

Description of the Related Art

It is known from the state of the art that remote access to wind farms for status query or configuration of one or more wind turbines or a wind farm controller is possible. Hitherto, however, remote access is possible only to a limited extent in order to satisfy security requirements. Thus, for example, a data transfer rate with which it is possible to gain access to a wind farm is severely restricted and generally a manufacturer-specific data protocol is to be used for that purpose.

Accordingly a wind farm has for example an access computer which is connected to the internet and which can be accessed from a remote computer by way of the internet. The access computer itself however is connected to components of the wind farm or the wind turbine which is to be accessed by way of a very slow manufacturer-specific data protocol in order in a remote access situation not to afford any possible option of implementing an extensive query or re-programming of the wind turbine or the wind farm in a short time. In addition possible functions using a remote access can be restricted so that only individual control commands or queries are possible by way of such a slow data communication.

Complete re-configuration or query in respect of status information, for example complete extensive loggings of the operating history can accordingly hitherto only be carried out by personnel who are directly connected to the component on site at the wind turbine or the wind farm.

Increasingly however there is a greater wish to be able to access a wind turbine or a wind farm and in particular a component of the wind turbine or the wind farm remotely to the greatest possible extent. Accordingly it is desirable for example to exchange large amounts of data with the component of a wind turbine or a wind farm from a remote computer in as real-time relationship as possible. Ideally accordingly an Ethernet connection which would be partially taken by way of the internet between the component and the remote computer would be desirable in order upon remote access to have the same options for acting on the control system, as a service operative who is on site has.

For security reason, however, such connections were refrained from being used as they are vulnerable to attacks and manipulation, thereby giving rise to the danger that an attacker could possibly gain access to one or more wind farms within a very short time. As wind energy nowadays provides a large proportion in the provision of power in the supply grid there is the danger that upon failure of a proportion of the wind energy in a region the complete supply grid collapses. It would therefore be possible for an attacker to manipulate a plurality of wind farms within a short time in such a way that a complete supply grid could collapse as a result.

In spite of extensive encryption algorithms in the data connection, an internet connection to a wind turbine or a wind farm is exposed to attacks from outside and therefore affords only limited security in relation to attackers.

On the German patent application from which priority is claimed the German Patent and Trade Mark Office searched the following documents: DE 10 2009 060 417 A1 and DE 20 2014 106 258 U1.

BRIEF SUMMARY

Provided is a fast data connection to a control component of a wind turbine or a wind park in order to exchange data at a comparatively higher data transfer rate with the wind turbine or the wind farm by a remote access. The data connection is secure from attackers.

Provided is a security apparatus for data exchange of a component of a wind turbine or a wind farm with a remote computer. The term "remote computer" describes a computer or data processor which is itself not a constituent part of the wind turbine or the wind farm, in which respect the term "remote" is not used to mean that a minimum spacing between the wind turbine or the wind farm and the computer has to be observed. Thus the remote computer can even be arranged directly beside the wind turbine or the wind farm or can also be several kilometers or several hundred or several thousand kilometers away. The term "remote computer" accordingly means at any event that the computer itself is not a constituent part of the wind turbine or the wind farm and therefore does not have direct access to components of the wind turbine or the wind farm.

The term "component" in contrast concerns a component which is a constituent part of a wind turbine or a wind farm, in particular a wind farm controller, and for example a control component. Accordingly the term "component" includes a data processing apparatus of the wind turbine or the wind farm controller, which is adapted for example to control the wind turbine or a plurality of wind turbines on the one hand but also for example only for the storage of operational data of the wind turbine or wind turbines.

The security apparatus has a first data interface adapted to connect the security apparatus to the component by way of a first data connection. In addition the security apparatus includes a second data interface adapted to connect the remote computer to the security apparatus by way of a second data connection. Further the security apparatus includes a third data interface with which a switching signal can be received by way of a third data connection. In addition provided within the security apparatus is a separable internal data connection between the first data interface and the second data interface. The separable internal data connection is thus adapted to connect the first data connection and the second data connection or to interrupt said connection.

In addition the security apparatus includes a switch adapted in dependence on the switching signal to separate or make a physical connection of the or within the first data connection.

Accordingly therefore a data connection is possible between the component of the wind turbine or the wind farm with a remote computer at least portion-wise by way of the first data connection and the second data connection and the separable internal data connection of the security apparatus. The separable internal data connection however has a physical connection which is separable. Examples in regard to separation of a physical connection is an electrical separation of the connection. Accordingly electric signals which serve for data transmission are not forwarded after separation. Separation of the physical connection is accordingly not limited to the situation where there is a mechanical interruption in the internal data connection, with that case also being included. Rather, separation of a physical connection signifies that the data signals are no longer exchanged between the first and second data interfaces.

When physical separation of the data connection takes place then it is not possible by way of that data connection to restore the data connection as the remote computer does not have any possible way of accessing the components of the wind turbines. Accordingly the components of the wind turbine or the wind farm are protected from attacks from a remote computer which for example does not have any authorization by a physical separation of the data connection to the remote computer.

If an access to a component of a wind turbine or a wind farm is to be effected remotely by a remote computer, it is firstly necessary to generate a switching signal for the security apparatus in order to make the physical connection of the internal data connection. It is only after the physical connection has been made that access to the component by the remote computer is then possible.

According to a first embodiment the security apparatus has a coupling unit, in particular a switch, a repeater, a router or a modem. The coupling unit includes the first data interface and the second data interface and requires a voltage supply for providing the internal data connection, that is to say for making the physical connection of the internal data connection. The voltage supply in that case can be switched on and/or off with the switch. Accordingly the physical connection of the internal data connection can be easily separated or made.

According to a further embodiment the security apparatus is adapted to automatically separate the physical connection in the situation that it is made, after a predetermined period of time, for example after a duration in the range of 30 seconds to 12 hours, or preferably in the range of one minute to one hour, for example after 30 minutes. In addition the security apparatus is additionally or alternatively adapted to automatically separate the physical connection in the situation where it is made, after inactivity of a data transmission over a predefined period of time.

If therefore it is missed out or if no switching signal is produced, which separates the physical connection of the internal data connection after the access, by virtue of a transmission error, then separation of the physical connection occurs automatically in order in that way to enhance the security requirements.

In addition, provided is a system which includes a security apparatus according to one of the above-specified embodiments. In addition the system includes an access computer having a fourth data interface in order to exchange data with the remote computer by way of a fourth data connection. The access computer is further adapted in dependence on the exchanged data between the remote computer and the access computer, that is to say in particular by way of data which are obtained by way of the fourth data interface, to produce the switching signal, in particular directly or indirectly.

The access computer is, for example, an SCADA computer of a wind turbine or a wind farm, which can be accessed by way of an internet connection. That computer therefore represents a first security instance which firstly has to be overcome in order to make the data connection between the component and the remote computer by way of the internal data connection of the security apparatus when an attacker would seek to carry out an attack and thus implement access to the component of the wind turbine.

According to a further embodiment the access computer is adapted to produce the switching signal directly and transmit it to the third data interface by way of the third data connection. Alternatively the access computer can be connected to the component of the wind turbine or the wind farm by way of a fifth data connection and adapted to produce the switching signal indirectly. For that purpose the access computer is adapted to cause the component by way of the fifth data connection to produce the switching signal and by way of a third data connection which is then implemented between the component and the security apparatus to transmit it to the third data interface of the security apparatus.

If previously defined particular requirements in respect of the access computer are met by the access computer, it is possible for the switching signal to be produced directly by the access computer. If however the access computer also represents a security apparatus which can be overcome for an attacker, in accordance with previously defined security requirements, it is alternatively provided that a data connection is made between the access computer and the component itself in order then to generate the switching signal by the computer itself. In that case the component and/or the fifth data connection represents a further security instance for an attacker.

Preferably the separable internal data connection has a data transfer rate which corresponds to more than a multiple of the data transfer rate of the third and/or fifth data connection. In comparison with the data connection between the component and the remote computer accordingly the data connection for producing the switching signal is very slow so that this slow transfer rate makes it difficult for an attacker to produce the switching signal by way of the access computer.

According to a further embodiment the third and/or fifth data connection is a serial data connection and/or a bus connection, in particular a field bus connection. Particularly preferably transfer is effected by way of the third and/or fifth data connection with a proprietary protocol. Even if therefore an attacker gains access to the access computer then, by virtue of the slow transfer rate of the third and/or fifth data connection and for example a protocol defined by the manufacturer, without knowledge about the protocol, it is only possible in a highly complicated and laborious fashion to produce the switching signal.

According to a further embodiment the first, second and/or fourth data connection is an Ethernet connection. If therefore a physical connection of the internal data connection is accordingly made then data can be very rapidly exchanged between the component of the wind turbine or the wind farm and the remote computer.

According to a further embodiment the system has an access point which is in particular a router or a VPN router. The access point serves to guide the connection to the remote computer in part by way of the second and/or fourth data connection and at least portion-wise by way of an internet connection or a network connection. According to a further embodiment one, a plurality of or all data connections are adapted to transmit encrypted data.

According to a further embodiment the component is a component or a constituent part of a wind farm controller or a component or a constituent part of a wind turbine. In addition the system according to a further embodiment includes a plurality of wind turbines and/or a wind farm controller.

According to a further embodiment the component is a constituent part of the system and is adapted to recognize predetermined accesses by a remote computer when the physical connection of the security apparatus is made and to interrupt the physical connection in dependence on the recognized accesses.

Accordingly predetermined accesses which include for example unusual accesses or also dangerous accesses like for example abrupt switching-off or separation of all installations of a wind farm from the grid can be recognized, whereby an attack can be registered. In dependence on an access which is recognized in that way the physical connection is then interrupted and in particular the access is not carried out.

In addition provided is a method of data exchange, that is to say for communication with a component of a wind turbine and/or a wind farm. The communication is effected with a security apparatus according to one of the above-mentioned embodiments and/or a system according to one of the above-mentioned embodiments.

In an embodiment of the method a switching signal is produced in order with the security apparatus to make and/or interrupt a physical connection of a separable internal data connection between a first data interface, with which the component is connected by way of a first data connection, and a second data interface, with which a remote computer is connected by way of a second data connection.

According to a further embodiment of the method after a predetermined period of time, for example after a duration in the range of 30 seconds to 12 hours, particularly preferably in the range of one minute to one hour, for example 30 minutes, or after inactivity for a predefined period of time in respect of data transmission, the physical connection is automatically interrupted.

BRIEF DESCRIPTION OF THE SEVERAL VIEWS OF THE DRAWINGS

Further configurations will be apparent from the embodiments by way of example described in greater detail with reference to the Figures in which.

DETAILED DESCRIPTION

Figure 1:
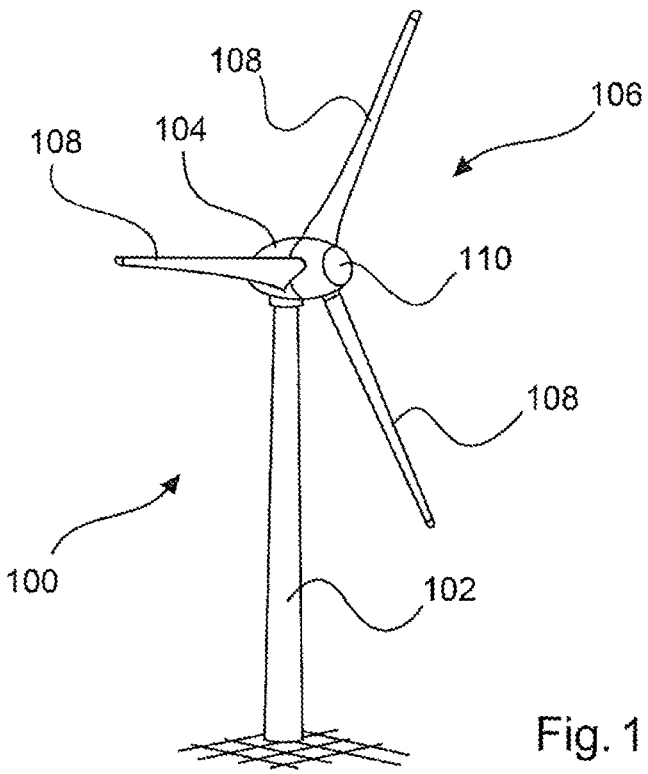
FIG. 1 shows a wind turbine.

FIG. 1 shows a diagrammatic view of a wind turbine according to the invention. The wind turbine 100 has a tower 102 and a pod 104 on the tower 102. Provided at the pod 104 is an aerodynamic rotor 106 having three rotor blades 200 and a spinner 110. The aerodynamic rotor 106 is caused to rotate in operation of the wind turbine by the wind and thus also rotates an electrodynamic rotor or rotor member of a generator which is directly or indirectly coupled to the aerodynamic rotor 106. The electric generator is arranged in the pod and generates electric energy. The pitch angles of the rotor blades 108 can be varied by pitch motors at the rotor blade roots of the respective rotor blades 108.

Figure 2:
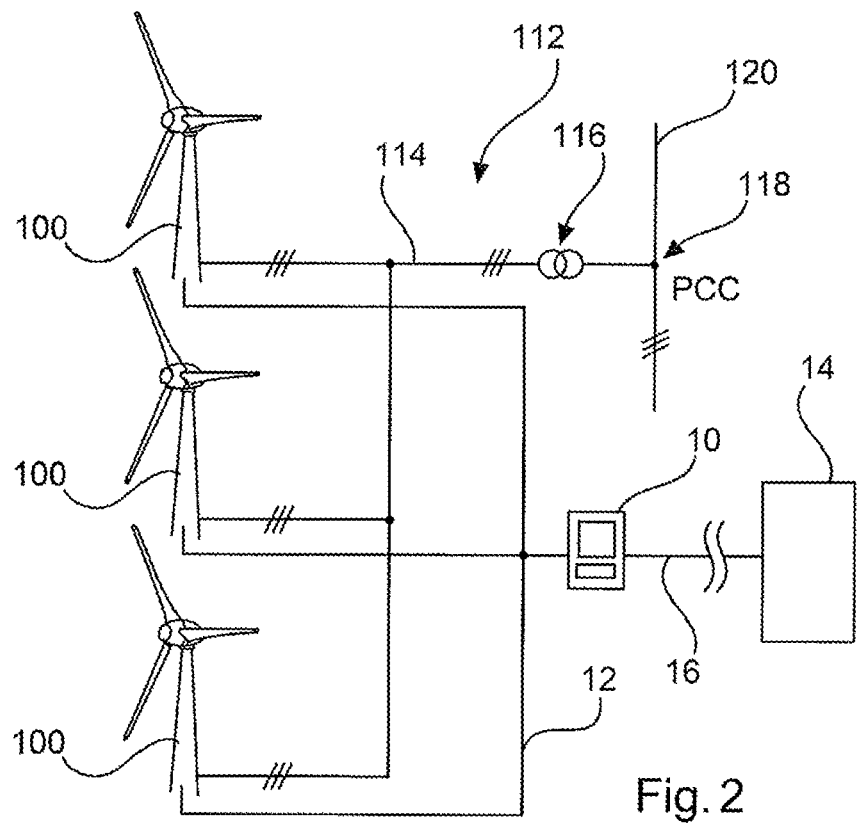
FIG. 2 shows a link arrangement of a wind farm to a remote computer.

FIG. 2 shows a wind farm 112 with by way of example three wind turbines 100 which can be the same or different. The three wind turbines 100 are thus representative for basically any number of wind turbines of a wind farm 112. The wind turbines 100 provide their power, more specifically in particular the generated current, by way of an electric farm network 114. In that case the respectively generated currents or powers of the individual wind turbines 100 are added up and generally there is a transformer 116 which steps up the voltage in the farm in order then to feed it into the supply grid 120 at the feed point 118 which is also generally referred to as the PCC. FIG. 2 is only a simplified view of a wind farm 112 and does not show for example a control although naturally a control is provided. In addition for example the park network 114 can be of a different configuration, in that for example a transformer is also provided at the output of each wind turbine 100, to mention just one other example.

FIG. 2 further shows a wind farm controller 10 connected to each of the wind turbines 100 for data exchange by way of a data line 12. The wind farm controller 10 and the wind turbines 100 can exchange data with each other by way of the data line 12 so that for example status data of the wind turbines 100 can be fed to the wind farm controller 10 for evaluation and/or the wind farm controller 10 can provide for open-loop or closed-loop control of the wind turbines 100 by way of the data connection 12.

In addition there is provided a remote computer 14 connected to the wind farm controller 10 by way of a further data connection 16. The remote computer 14 which for example is a control center of the wind farm operator or the wind farm manufacturer provides that status information can be called up from the wind farm controller 10 or the wind turbines 100 can be controlled, configured or the like by way of the wind farm controller 10.

In this case the wind farm controller 10 includes an embodiment by way of example of the system which is described hereinafter with reference to FIG. 3.

Figure 3:
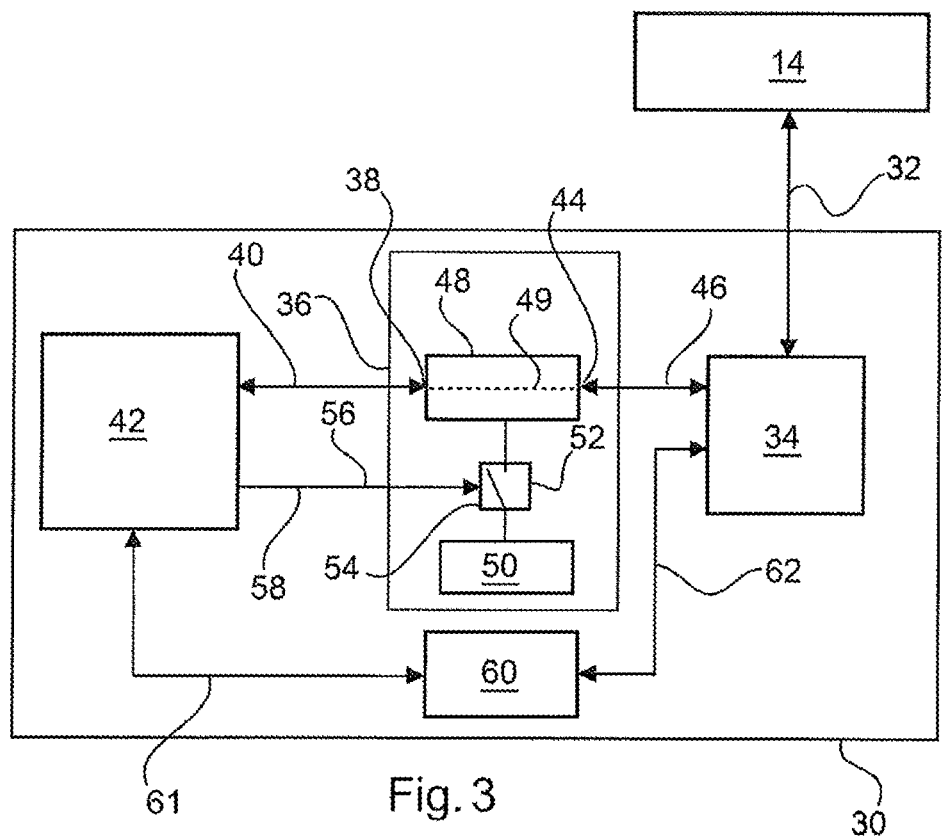
FIG. 3 shows the system with the security apparatus according to an embodiment.

In accordance therewith FIG. 3 shows an embodiment of a system 30 arranged for example in a wind farm controller 10 or a wind turbine 100. The system 30 is connected by way of an internet connection 32 to a remote computer 14 which for example is arranged locally at the wind turbine manufacturer themselves, the operator of the wind turbine or turbines or a grid operator.

The system 30 has an access point 34 with which the internet connection 32 can be made. The access point 34 is for example a VPN router. In addition the system 30 includes a security apparatus 36 having a first interface 38. A first data connection 40 can be made by way of the first interface 38 with a component 42 of the wind farm controller 10 which for example is a control component 42 of the wind farm controller 10. In addition the security apparatus 36 includes a second data interface 44 with which the security apparatus 36 is connected to the access point 34 by way of a second data connection 46.

The first data interface 38 and the second data interface 44 are component parts of a coupling unit 48 of the security apparatus 36. The coupling unit 48 represents an internal data connection 49 between the first data interface 38 and the second data interface 44, wherein to make that internal data connection 49, the coupling unit 48 which for example is an Ethernet switch must be supplied with a voltage supply 50. When the voltage supply 50 is separated from the coupling unit 48 then separation of a physical connection of the internal data connection 49 is the result.

In addition there is a switch 52 which can separate the voltage supply 50 for the coupling unit 48 from the coupling unit 48 so that the internal data connection 49 within the coupling unit 48 can be made or interrupted. The switch 52 of the security apparatus 36 has for that purpose a third data interface 54, by way of which a switching signal 56 can be received. The switching signal 56 can be produced by the component 42 and fed by way of a third data connection 58 to the third data interface 54.

In that case the switching signal 56 is produced by a connection being made by way of the access point 34 between the remote computer 14 and an access computer 60. For that purpose the access computer 60 is connected to the access point 34 by way of a fourth data connection 62. By way of the internet connection 32 to the access point 34 and the fourth data connection 62 to the access computer 60 it is possible to produce a message which is fed from the access computer 60 using a proprietary protocol to the component 42 by way of a fifth data connection 61. That message then causes the component 42 to produce a switching signal 56 which is fed by way of the third data connection 58 to the switch 52 of the security apparatus 36 in order to provide a voltage supply 50 for the coupling unit 48 in order in that way to make a data connection between the component 42 and the remote computer 14 by way of the first data connection 40, the internal data connection 49 of the coupling unit 48, the second data connection 46 and the internet connection 32.

After the expiry of a predetermined period of time, preferably 30 minutes, the switch 32 again interrupts the voltage supply 50 of the coupling unit 48 so that the data connection between the component 42 and the remote computer 14 is interrupted. The data connection between the access computer 60 which for example is an SCADA system and the component 42 is a comparatively slow data connection, for example a bus connection involving a proprietary protocol, which has a data transfer rate which at any event is a multiple less than the data transfer rate of the connection by way of the coupling unit 48 between the component 42 and the remote computer 14.

Figure 4:
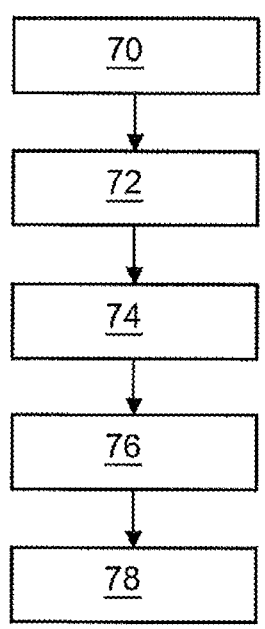
FIG. 4 shows an embodiment of an implementation of the method.

FIG. 4 shows an embodiment of a method in which the component 42 of a wind turbine 100 or a wind farm 112 is accessed by a remote computer 14. In step 70 a connection is made between a remote computer 14 and an access computer 60 of the wind farm 112. Then in step 72 a message is generated by the access computer 60 and transmitted to the component 42. Then in subsequent step 74 a switching signal 56 is produced in the component 42 and transmitted to a switch 52 of a security apparatus 36. Then in step 76 a physical connection of an internal data connection 49 in a coupling unit 48 of the security apparatus 36 is made between a first data interface 38 and a second data interface 44. Then step 78 involves access from the remote computer 14 by way of the coupling unit 48 of the security apparatus 36 with the component 42.

The invention claimed is:

1. A security apparatus for data exchange of a component of a wind turbine or a wind farm with a remote computer, wherein the security apparatus comprises:
   a first data interface configured to connect the component by way of a first data connection;
   a second data interface configured to connect the remote computer by way of a second data connection;
   a third data interface configured to receive a switching signal by way of a third data connection;
   a separable internal data connection between the first data interface and the second data interface; and
   a switch configured, in dependence on the switching signal, to switch between a separation and a physical connection of the internal data connection.

2. The security apparatus according to claim 1 further comprising a coupling unit that includes the first data interface and the second data interface, wherein the coupling unit has a voltage supply for providing the internal data connection, and wherein the voltage supply is configured to be switched between on and off by the switch between the separation and the physical connection of the internal data connection.

3. The security apparatus according to claim 1 wherein the security apparatus is adapted to automatically separate the physical connection of the internal data connection after a predetermined period of time.

4. A system comprising:
   the security apparatus according to claim 1, and
   an access computer adapted to exchange data with the remote computer by way of a fourth data connection to produce the switching signal in dependence on the exchanged data.

5. The system according to claim 4 wherein the access computer is adapted to produce the switching signal directly and transmit the switching signal by way of the third data connection to the third data interface, or
   wherein the access computer is connected to the component by way of a fifth data connection and is adapted to produce the switching signal indirectly, by causing the component to produce the switching signal by way of the fifth data connection and transmit the switching signal by way of the third data connection to the third data interface.

6. The system according to claim 5 wherein the separable internal data connection has a data transfer rate that is more than a multiple of a data transfer rate of at least the third data connection or the fifth data connection.

7. The system according to claim 5 wherein at least one of the third data connection or the fifth data connection is a serial data connection or a bus connection.

8. The system according to claim 4 wherein at least one of the first data connection, the second data connection or the fourth data connection is an Ethernet connection.

9. The system according to claim 4 further comprising a router or VPN router to guide the internal data connection to the remote computer by way of the second data connection or the fourth data connection at least portion-wise by way of an internet connection or a network connection.

10. The system according to claim 4 wherein at least one of the first, second, or third data connections are adapted to transmit encrypted data.

11. The system according to claim 4 wherein the component is a component of a wind farm controller or the wind turbine.

12. The system according to claim 4 wherein the security apparatus is configured for data exchange of components of a plurality of wind turbines and/or a wind farm controller with the remote computer.

13. The system according to claim 4 wherein the component is adapted to recognize predetermined accesses and to separate the physical connection in dependence on the recognized accesses.

14. A method of data exchange with a component of a wind turbine or a wind farm, wherein the data exchange is carried out using the security apparatus according to claim 1.

15. The method according to claim 14 comprising producing the switching signal with the security apparatus to make and/or separate the physical connection of the separable internal data connection between the first data interface to which the component is connected by way of the first data connection and the second data interface to which the remote computer is connected by way of the second data connection.

16. The method according to claim 14 wherein the physical connection of the internal data connection is separated automatically after a predetermined period of time.

17. The security apparatus according to claim 1, wherein the component is a wind farm controller.

18. The security apparatus according to claim 2 wherein the coupling unit is one of a switch, a repeater, a router, or a modem.

19. The security apparatus according to claim 3 wherein the predetermined period of time is within a range of thirty seconds to twelve hours or is a predetermined period of time of inactivity.

20. The system according to claim 7, wherein at least the third data connection or the fifth data connection is a field bus connection with a proprietary protocol.

\* \* \* \* \*